US010079000B2

(12) United States Patent
Zheng et al.

(10) Patent No.: US 10,079,000 B2
(45) Date of Patent: Sep. 18, 2018

(54) REDUCING DISPLAY DEGRADATION

(71) Applicant: Microsoft Technology Licensing, LLC, Redmond, WA (US)

(72) Inventors: Ying Zheng, Redmond, WA (US); Rajesh Manohar Dighde, Redmond, WA (US); Xiaoyan Hu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 14/824,987

(22) Filed: Aug. 12, 2015

(65) Prior Publication Data

US 2017/0047044 A1    Feb. 16, 2017

(51) Int. Cl.
| | | |
|---|---|---|
| *G09G 5/10* | (2006.01) | |
| *G09G 3/20* | (2006.01) | |
| *G09G 3/32* | (2016.01) | |
| *G09G 5/14* | (2006.01) | |

(Continued)

(52) U.S. Cl.
CPC ............. *G09G 5/10* (2013.01); *G06F 3/0481* (2013.01); *G06F 3/04845* (2013.01); *G06F 3/04847* (2013.01); *G09G 3/20* (2013.01); *G09G 3/32* (2013.01); *G09G 5/14* (2013.01); *G09G 2320/0233* (2013.01); *G09G 2320/0271* (2013.01); *G09G 2320/046* (2013.01); *G09G 2320/0613* (2013.01); *G09G 2320/0626* (2013.01); *G09G 2320/0686* (2013.01); *G09G 2320/08* (2013.01); *G09G 2320/103* (2013.01);

(Continued)

(58) Field of Classification Search
CPC ... G09G 5/10; G06F 3/04847; G06F 3/04845; G06F 3/0481
See application file for complete search history.

(56) References Cited

U.S. PATENT DOCUMENTS

| | | |
|---|---|---|
| 7,158,169 B1 | 1/2007 | Farber et al. |
| 7,397,497 B2 | 7/2008 | Murakami et al. |
| 7,440,006 B2 | 10/2008 | Lin et al. |

(Continued)

FOREIGN PATENT DOCUMENTS

WO    2007042744 A1    4/2007

OTHER PUBLICATIONS

International Search Report and Written Opinion dated Apr. 3, 2017 from PCT Patent Application No. PCT/US2016/042699, 19 pages.

(Continued)

*Primary Examiner* — Carolyn R Edwards
(74) *Attorney, Agent, or Firm* — Rainier Patents, P.S.

(57) ABSTRACT

The description relates to maintaining display device image quality. One example can include a display that includes a set of multiple pixels. Individual pixels comprise multiple color light emitting diodes (LEDs). The example can also include a processor configured to convert image related data into frame renderings for driving the multiple pixels of the display. The example can further include a context-aware anti-degradation component configured to receive a notification from the processor of a change to an individual frame rendering and to adjust lumination intensity values of unchanged portions of the individual frame rendering without comparing the individual frame rendering to a previous individual frame rendering.

25 Claims, 8 Drawing Sheets

(51) Int. Cl.
*G06F 3/0481* (2013.01)
*G06F 3/0484* (2013.01)

(52) U.S. Cl.
CPC ... *G09G 2330/04* (2013.01); *G09G 2360/144* (2013.01)

(56) References Cited

U.S. PATENT DOCUMENTS

| | | | |
|---|---|---|---|
| 7,881,555 B2 | 2/2011 | Spahn | |
| 8,054,383 B2 | 11/2011 | Lee | |
| 8,254,685 B2 | 8/2012 | Greene et al. | |
| 2005/0157171 A1 | 7/2005 | Bowser | |
| 2006/0007249 A1 | 1/2006 | Reddy et al. | |
| 2007/0222860 A1 | 9/2007 | Katayama et al. | |
| 2007/0236410 A1 | 10/2007 | Shimizu | |
| 2007/0263091 A1 | 11/2007 | Kato et al. | |
| 2011/0157170 A1 | 6/2011 | Bennett et al. | |
| 2013/0307792 A1* | 11/2013 | Andres | G11B 27/005 345/173 |
| 2013/0314454 A1* | 11/2013 | Jin | G09G 3/3406 345/690 |
| 2014/0192100 A1 | 7/2014 | Tada | |
| 2014/0375704 A1 | 12/2014 | Bi et al. | |

OTHER PUBLICATIONS

Luis D, "Amoled Burn-In Fixer Promises an Easy Fix for Your Android Smartphone Screen's Pesky Burn-In Issues ", Published on: Jan. 5, 2015 Available at: "http://www.phonearena.com/news/AMOLED-Burn-in-Fixer-promises-an-easy-fix-for-your-Android-smartphone-screens-pesky-burn-in-issues_id64344".

Nahar et al., "Burn-in Reduction using Principal Component Analysis", in Proceeding of IEEE International Test Conference, Nov. 8, 2005, 10 pages.

Lee et al., "A Measurement and Analysis Method of Image Sticking in LCD", in Journal of SID Symposium Digest of Technical Papers, vol. 33, No. 1, May, 2002, 4 pages.

* cited by examiner

REDUCING DISPLAY DEGRADATION

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DESCRIPTION

Many types of displays can suffer from image degradation due to screen burn-in affecting some or all of the display's pixels. The present implementations can track portions of the display that are displaying static content. The implementations can take anti-degradation actions to reduce screen burn-in of these static portions. However, rather than merely applying blanket rules to determine the actions, the present implementations can also provide an improved user experience by considering a context of these static portions when deciding what actions to take. Thus, the present concepts can be viewed as relating to context-aware anti-degradation management of displays.

Figure 1:
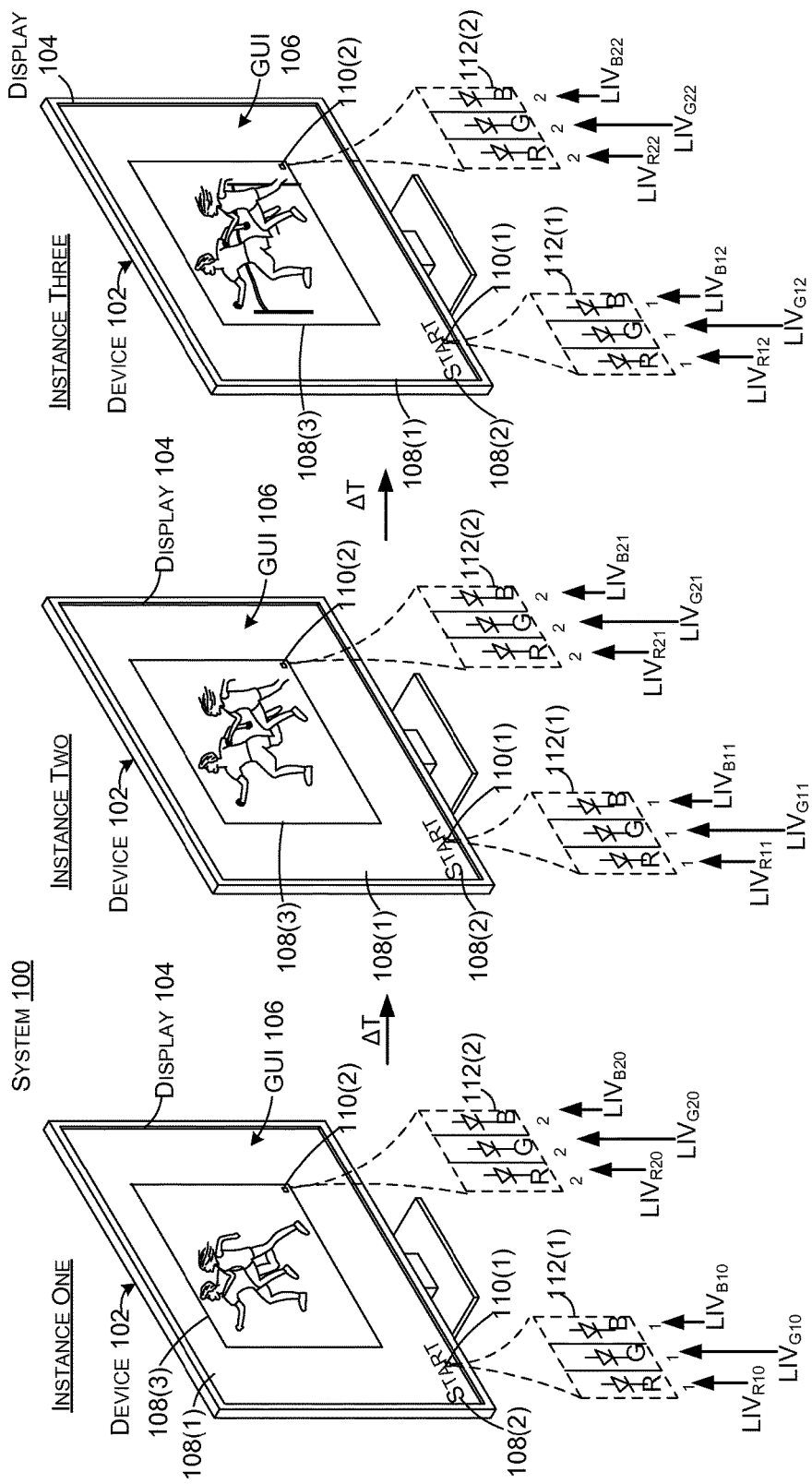
FIGS. 1-5 show system examples in which context-aware anti-degradation adjustment can be employed in accordance with some implementations of the present concepts.

FIG. 1 shows a system 100 involving a device 102 and illustrates an introductory context-aware anti-degradation example relative to device 102. The device can include a display or screen 104 for displaying a graphical user interface (GUI) 106. In this example, the GUI includes a background or desktop graphical window 108(1), a 'start' graphical window 108(2), and a video player graphical window 108(3). (For the remainder of the document, "graphical window" is shortened to "window").

The display 104 can include multiple pixels 110. For sake of brevity, only two pixels 110(1) and 110(2) are designated with specificity. Individual pixels can include one or more independently controllable light emitting diodes (LEDs) 112. LEDs are an example of a type of display that is subject to screen burn-in. LEDs can be manifest as organic light emitting diodes (OLED), such as active matrix organic light emitting diodes (AMOLED), inorganic light emitting diodes, and/or other controllable devices or materials, such as quantum dot materials. Individual pixels may also be implemented using a liquid crystal display (LCD), a color filter, and a backlight (in which the backlight itself may be comprised of one or more LEDs). In an LCD, it is possible that the LEDs in the backlight or the LCD pixels themselves may degrade or otherwise suffer from defects or distortion. In the example configuration of FIG. 1, each pixel 110 includes a red (R) LED, a green (G) LED, and a blue (B) LED. In this example, pixel 110(1) is in the 'start' window 108(2) and pixel 110(2) is in the video player window 108(3). Individual pixels can be driven at a lumination intensity value (LIV) to contribute to the GUI 106.

As mentioned above, AMOLED displays are an example type of device that can experience image degradation associated with burn-in. In the case of AMOLED displays, burn-in can be a two-fold problem. First, the organic light-emitting materials degrade over time and so any static images illuminated on the AMOLED display over long periods of time can lead to a burn-in pattern replicating the static image. Second, AMOLED devices can experience differential aging of the light emitting colors. For instance, blue light emitting materials can degrade faster than red and/or green light emitting materials. Thus, the differential aging can cause a color shift in displayed images as the device ages. The severity of image burn-in/sticking strongly depends on the display time and the luminance level of the image content.

For purposes of explanation, FIG. 1 shows device 102 at Instance One, Instance Two, and Instance Three, which each show GUI 106 on display 104. Instance Two occurs subsequent to Instance One and Instance Three occurs subsequent to Instance Two. For example, Instance One, Instance Two, and Instance Three may show three consecutive display frames. In another example, Instance One, Instance Two, and Instance Three may be separated by a number of frames, such as 100 frames between Instance One and Instance Two and another 100 frames between Instance Two and Instance Three. Alternatively, the instances may occur a duration of time apart, such as one second, for example.

Assume for purposes of explanation that the lumination of pixel 110(1) is static between Instance One and Instance Two and the lumination of pixel 110(2) is static between Instance One and Instance Two. Stated another way, for pixel 110(1) the lumination intensity values (e.g., driving power) for $LIV_{R10}$, $LIV_{G10}$, and $LIV_{B10}$, of Instance One are identical to the lumination intensity values $LIV_{R11}$, $LIV_{G11}$, and $LIV_{B11}$, of Instance Two and similarly for pixel 110(2) the lumination intensity values for $LIV_{R20}$, $LIV_{G20}$, and $LIV_{B20}$, of Instance One are identical to the lumination intensity values $LIV_{R21}$, $LIV_{G21}$, and $LIV_{B21}$, of Instance Two. Also, for purposes of explanation, assume that the lumination intensity values of these pixels is relatively high. As such, these static pixel lumination intensity values can lead to display burn-in and can be addressed by system 100 at Instance Three. For instance, the lumination intensity values of pixels 110(1) and 110(2) can be dimmed at Instance Three. However, simply dimming these pixels at Instance Three could diminish the user experience.

For instance, relative to the video player window 108(3), assume that the two runners are moving and thus the pixels occupied by the runners and the adjacent pixels are changing (e.g., the pixel luminosities are changing from frame to frame), but the background, such as pixel 110(2) is relatively static. Simply dimming this static content could produce a visual result where the runners appeared bright and much of the background of the video appeared dim. Most users would rather avoid such a viewing experience. To address such issues, the present implementations can consider the context of pixels when making lumination adjustments. For instance, the context can be captured by multiple display parameters. One such display parameter can relate to the condition of other pixels in the same window 108 as pixels 110(1) and 110(2). In this case, all of the pixels in the 'start' window 108(2) are static in a similar fashion to pixel 110(1). As such, this display can weigh toward dimming pixel 110(1) (and the other pixels in the window) since the general appearance of the window can be maintained but at a lower luminance. In contrast, as mentioned above, other pixels of video player window 108(3) are changing. This display parameter can weigh against dimming pixel 110(2). Other display parameters are described below relative to FIGS. 2-4.

Instance Three shows the resulting context-aware anti-degradation adjustments to GUI 106. In this case, the lumination intensity values for $LIV_{R12}$, $LIV_{G12}$, and $LIV_{B12}$, of pixel 110(1) are reduced relative to Instances One and Two. The pixel lumination can be reduced uniformly (e.g., lumination of red, green, and blue LEDs each reduced 5%, for instance). Alternatively, individual LEDs of the pixel can be handled differently. For example, blue LEDs tend to burn-in (e.g., suffer degradation) faster than red and green LEDs and/or use more power than red and green LEDs, as such the blue LED could be reduced by 15% and the red and green LEDs reduced by 10%, for example. In this case, lumination intensity values for $LIV_{R22}$, $LIV_{G22}$, and $LIV_{B22}$, of pixel 110(2) can be maintained at the same levels as Instance One and Instance Two to maintain a visually satisfying viewing experience.

Note however, that the context-aware anti-degradation adjustments can continue beyond Instance Three. For example, in one configuration, context-aware anti-degradation adjustments to static pixels belonging to a static window can be made in accordance with a first threshold whereas context-aware anti-degradation adjustments to pixels of a dynamic window can be made in accordance with a second different threshold. For instance, window 108(2) is a static window and pixel 110(1) is adjusted in accordance with a first short threshold between Instance Two and Instance Three. For example, the first threshold could be satisfied as soon as static pixels are detected in two consecutive sampled frames. In such a case, context-aware anti-degradation adjustments can be made to the pixels of the static window 108(2) immediately (or relatively quickly). This process can be repeated. For instance, if pixel 110(1) (and the rest of the pixels in window 108(2)) remains static in the next sampled frame, the pixel can be dimmed further. For example the pixels could be dimmed one percent for each sampling period up to a maximum dimming value, such as 50%, for instance.

The second threshold relating to windows that include dynamic pixels and/or both static and dynamic pixels can be longer than the first threshold or in some other way weighted toward preserving the user experience but still reducing burn-in damage. For instance, the second threshold could be set at a longer duration, such as ten minutes or sixty minutes so that if pixel 110(2) of window 108(3) remains static for ten minutes, some context-aware anti-degradation adjustments can be made. One adjustment could entail dimming the entire window 108(3) (e.g., all the pixels in the window) rather than portions of the window (e.g., individual pixels). Thus, from one perspective, the duration of time that a pixel has been static can be considered a display parameter that can be considered in determining whether to adjust the pixel lumination intensity. Similarly, what window the pixel is in and the state of other pixels in the window can be considered as display parameters. Also, the lumination intensity and/or color of the pixel can be considered as display parameters. For instance, a static bright blue pixel may be more problematic than a static dim red pixel. Additional display parameter examples are described below.

Figure 2:
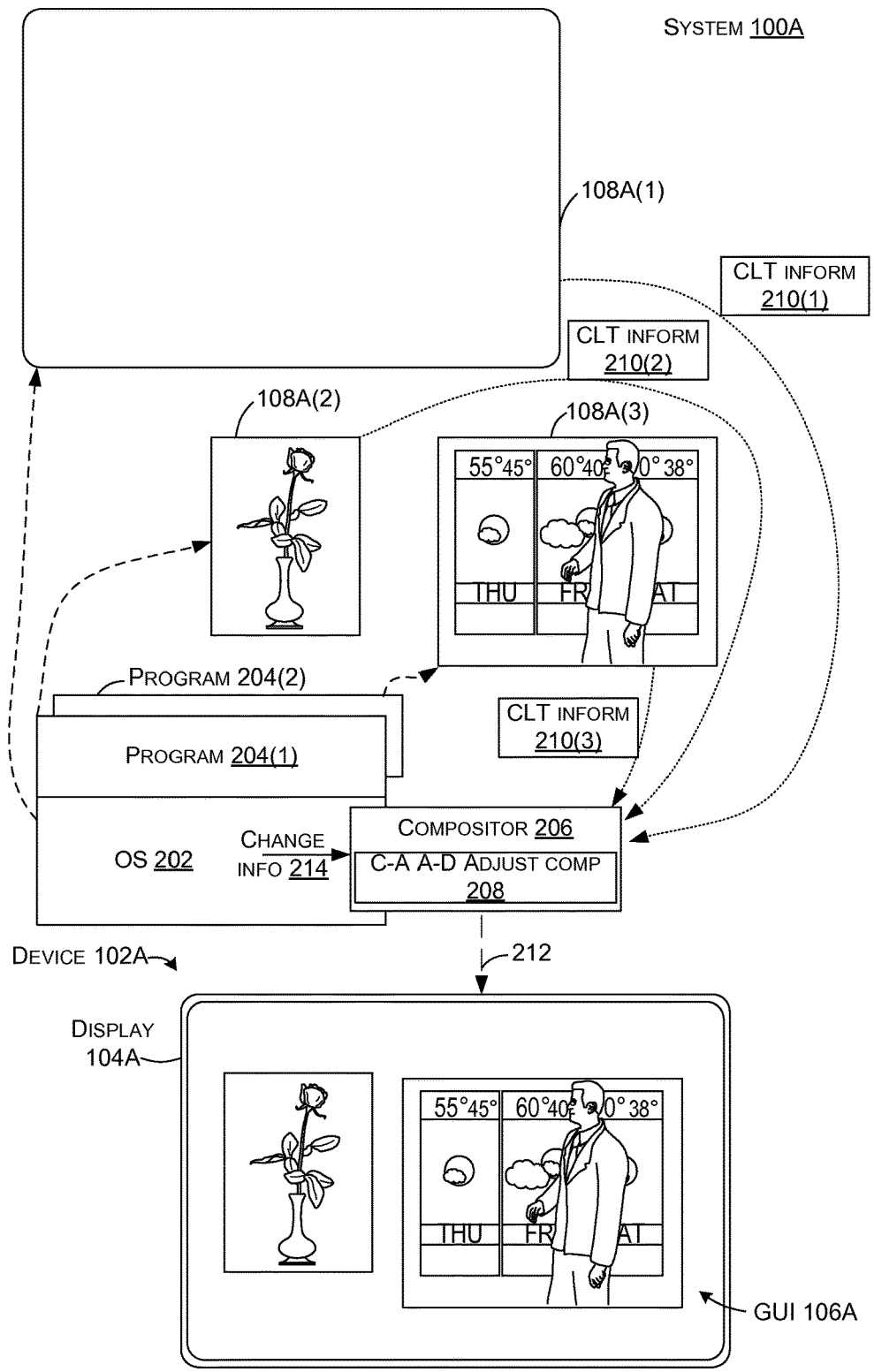
Figure 3:
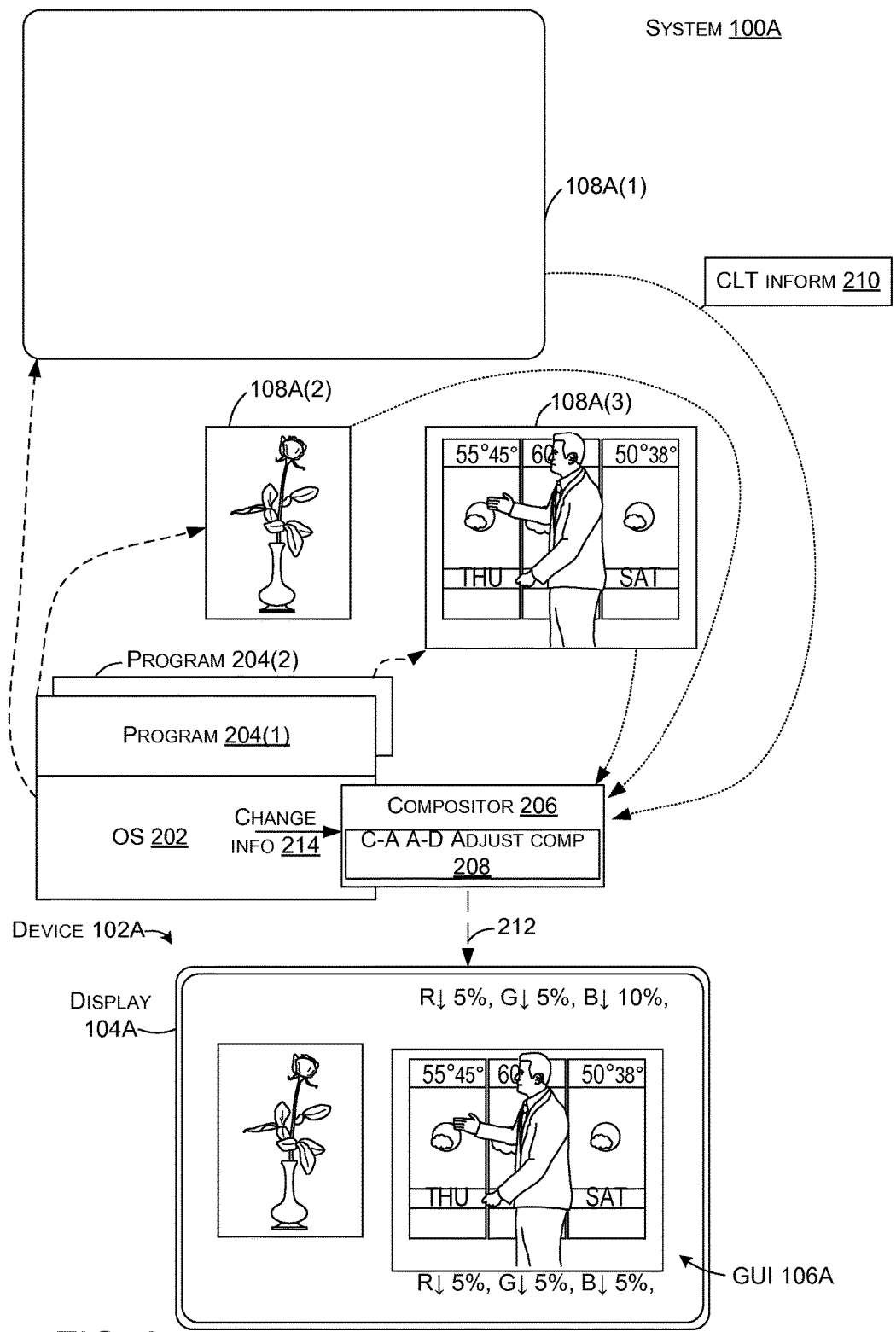
Figure 4:
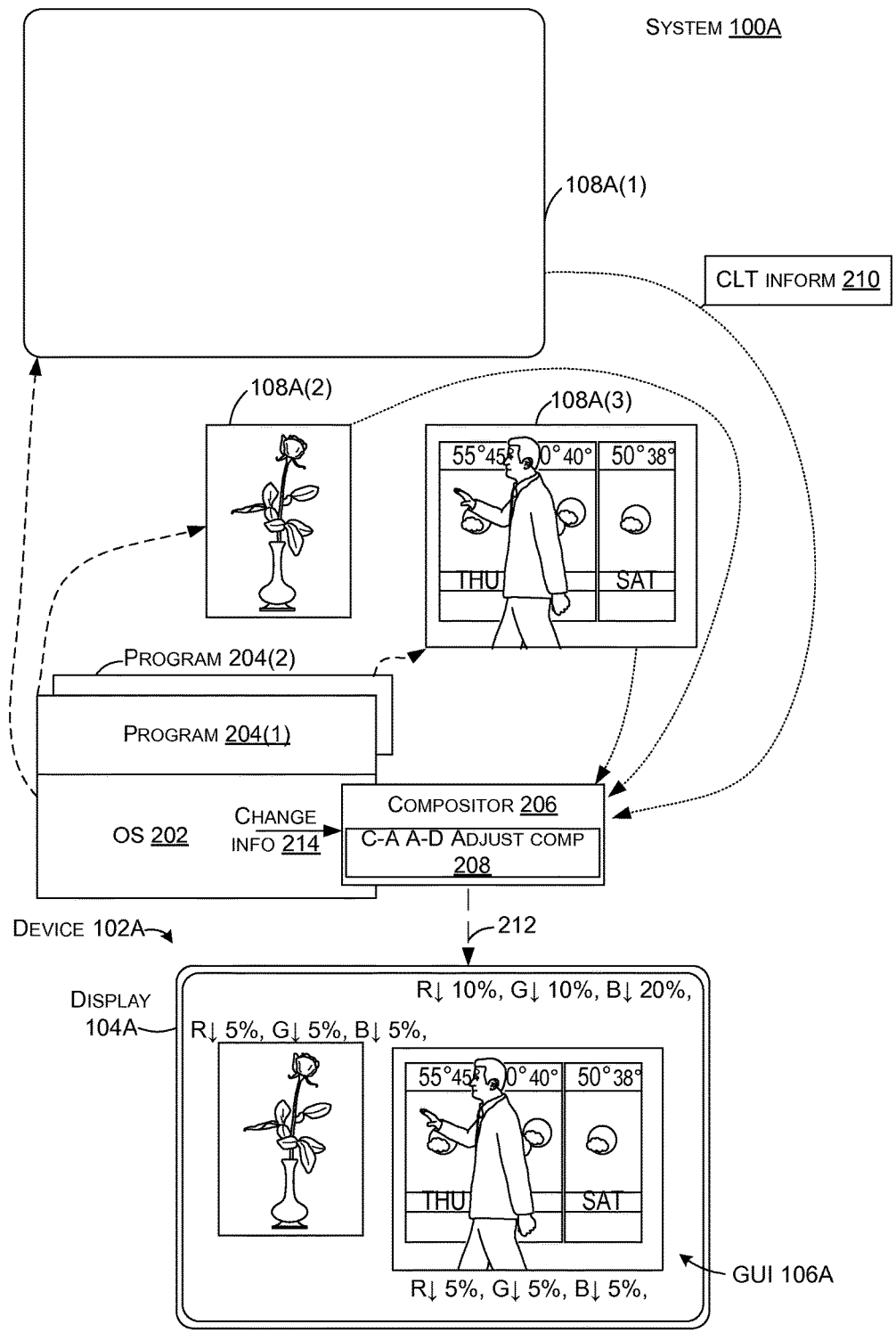

FIGS. 2-4 collectively show another context-aware anti-degradation system 100A. In this case, an operating system 202 can operate cooperatively with programs/applications 204 to generate windows 108A. In this case, for purposes of explanation, window 108A(1) is a desktop or background window of a solid color that is generated by the operating system 202, window 108A(2) is a photo editing application window associated with application/program 204(1), and window 108A(3) is a video player program window associated with program 204(2). In this example window 108A(2) is a photograph of a rose in a vase and window 108A(3) is video of a weather broadcast. Of course, windows associated with other programs are contemplated beyond these examples. Further, an individual program can have multiple windows open. For instance, the photo editing program could be generating multiple windows relating to different photographs. Each of these windows can be addressed individually.

The operating system 202 can operate cooperatively with or include a compositor 206 to generate GUI 106A from the windows 108A. The operating system 202 and/or the compositor 206 can include or work cooperatively with a context-aware anti-degradation adjustment component 208 and the programs 204.

Individual windows 108A can include color information (e.g., lumination intensity values discussed above relative to FIG. 1), location information, and/or transparency information indicated generally as (color, location, and/or transparency (CLT)) information at 210. Transparency can relate to border regions where windows meet and blend into one another, as well as windows layered above or below other windows. The compositor 206 can use this CLT information 210 to generate the GUI 106A as indicated at 212.

The operating system 202 can also provide change information 214 that indicates pixels and/or windows that have changed from the previous frame. The change information can be in the form of a change notification or change indication. The change information can relate to individual pixels (e.g., changed pixel indication), individual windows (e.g., changed window indication), blocks of pixels (such as 100×100 pixels at this location), rows of pixels, or some other form. The context-aware anti-degradation adjustment component 208 can identify from the change information what portions of the GUI 106A have changed from the previous frame. The context-aware anti-degradation adjustment component 208 can then determine what portions have not changed (e.g., the portions not included in the change information 214 that are static). The context-aware anti-degradation adjustment component can also identify the context of the changes as reflected in various display parameters (e.g., what windows are static, what windows are changed, and which portions of the changed windows are static and which portions changed). The context-aware anti-degradation adjustment component 208 can determine how to adjust the GUI 106A based upon changed and/or static portions as well as other display parameters. Several display parameters are introduced above relative to FIG. 1. These display parameters and/or alternative display parameters are described below.

In some implementations, system 100A can allow various display parameters to be defined for individual windows. In one case, the operating system 202 can include application program interfaces (illustrated and discussed below relative to FIG. 5) that allow a programmer or developer of the program to define various display parameters that define how context-aware burn-in adjustments are handled for the window(s) of their program. Alternatively or additionally the OS can allow the user to define display parameters for how context-aware burn-in adjustments are handled on the individual windows of their device 102A. For instance, relative to the photo editing program 204(1), the developer may specify that color accuracy/integrity should be maintained in any context-aware burn-in adjustments. The user may subsequently add this display parameter and specify that he/she does not want any dimming of the photo editing program window 108A(2), for example. Alternatively, the user may specify that a certain amount of dimming can be employed as long as color integrity is maintained.

Relative to the video player program 204(2), the developer may specify that if any dimming is performed on window 108A(3), the dimming should be performed uniformly over all pixels of the window. Alternatively or additionally, the user might specify that any dimming be limited to 10%, for example. For instance, the user may be able to access a GUI, such as through a settings menu that allows the user to define individual display parameters that are used in context-aware burn-in adjustments. Thus, the programmer may define how the context-aware burn-in adjustments should be handled for their program and the user can modify and/or redefine how he/she wants these adjustments handled.

Further, these display parameters can be inter-related to other display parameters. For instance, the type of display that is being used can be considered as a display parameter. For instance, the programmer may specify a first more aggressive adjustment protocol for a first display type that is relatively more prone to burn-in degradation and a second adjustment protocol for a second display type that is relatively less prone to burn in degradation. Similarly, the user, upon initial start-up of the device, may be presented with a GUI that explains burn-in risks on the device. The GUI can allow the user to specify how aggressively he/she wants to be in preventing burn-in generally and/or for specific programs.

Another display parameter that can be considered is the ambient operating conditions of the device. For instance, a device that is operated in full sun conditions may need as much brightness as possible for the user to see the display. In contrast, when the device is operated in low light conditions, aggressive dimming can be employed to reduce burn-in with little or no effect on the user experience.

Another display parameter that can be considered is the composition of the image of the window. For instance, assume that background window 108A(1) is a solid color, such as green. Dimming this background, such as for example by 10%, will not likely have much negative effect on the user's viewing experience of the overall GUI. Even if blue is dimmed to a greater extent than other colors to protect blue LEDs, any color shift of the 'green' background image is unlikely to be perceived negatively by the user. In contrast, any changes to a photo in a photo editing window, such as window 108A(2) could affect the perceived artistic balance between the colors of the image. For instance in the illustrated example, any changes to the colors and/or relative brightness of the vase, the rose leaves, the rose petals, and/or the background might change the balance of the photo and be undesirable to the user. Similarly, relative to video player window 108A(3), dimming the static background on the weather report can create an unbalanced image where the newsman is bright and the background is dim in a manner that is distracting to the user.

The operation of system 100A and example context-aware anti-degradation adjustments can be understood by comparing FIGS. 2-4. Starting at FIG. 2, information about windows 108A(1), 108A(2), and 108A(3) can be conveyed to the compositor 206 as CLT information 210(1), 210(2), and 210(3) respectively. The compositor 206 can use the CLT information to generate GUI 106A on display 104A.

FIG. 3, is similar to FIG. 2 except that the weatherman has moved in image 108A(3). This information is conveyed to the compositor 206 as change information 214. This change information also reveals the static portions of the GUI 106A (e.g., all portions not associated with the change information 214 can be treated as static portions). Thus, window 108A(1) is static, window 108A(2) is static, and window 108A(3) contains both static and changed portions. The context-aware anti-degradation adjustment component 208 can utilize the change information 214, CLT information 210(1), 210(2), and 210(3), and various display parameters to identify what adjustment to make, if any, to GUI 106A. Assume that in this configuration, operating system 202 has specified that the background (e.g., window 108A(1)) can be dimmed and that color integrity does not need to be maintained during the dimming. Assume further that program 204(1) has defined that window 108A(2) should not be dimmed in either bright light or normal light ambient conditions, but can be dimmed if the ambient lighting conditions are low as long as color integrity is maintained. Assume further, that program 204(2) has defined that window 108A(3) can be dimmed up to 5%, but all pixels of the window must be dimmed an equivalent amount.

Thus, as evidenced in GUI 106A of FIG. 3, relative to the lumination intensity values of FIG. 2, window 108(A)1 is dimmed as follows: Red decreased 5% (R↓5%), Green is decreased 5% (G↓5%), and Blue is decreased 10% (B↓10%); window 108A(2) is unchanged; and in window 108A(3) Red is decreased 5% (R↓5%), Green is decreased 5% (G↓5%), and Blue is decreased 5% (B↓5%).

Assume further that between FIG. 3 and FIG. 4, device 102A is moved into a low ambient light environment and that the weatherman continued to move in window 108A(3), but that all other content remained static. As shown in GUI 106A of FIG. 4, relative to the lumination intensity values of FIG. 2, window 108(A)1 is dimmed as follows: Red decreased 10% (R↓10%)(or an addition 5% relative to FIG. 3), Green is decreased 10% (G↓10%)(or an addition 5% relative to FIG. 3), and Blue is decreased 20% (B↓20%)(or an addition 10% relative to FIG. 3); for window 108A(2), Red is decreased 5% (R↓5%), Green is decreased 5% (G↓5%), and Blue is decreased 5% (B↓5%); and for window 108A(3), lumination intensity values are held stable relative to FIG. 3, but viewed relative to FIG. 2, the lumination intensity values for Red is decreased 5% (R↓5%), Green is decreased 5% (G↓5%), and Blue is decreased 5% (B↓5%).

Thus, window 108A(1) was stepped down from FIG. 2 to FIG. 3 by 5% for Red, 5% for Green, and 10% for Blue. From FIG. 3 to FIG. 4, the lumination intensity values are decreased another step of an equal amount to create the overall decrease of 10%, 10%, and 20%. Such an approach can be less noticeable (e.g., distracting) to the user. Window 108A(2) is not changed between FIG. 2 and FIG. 3, but is changed between FIG. 3 and FIG. 4 because the ambient light parameter was satisfied when the ambient light decreased and the 5%, 5%, 5% reduction can maintain color integrity. Window 108A(3) is not changed further between FIGS. 3 and 4 because the window was already dimmed by the maximum allowed by program 204(2) between FIGS. 2 and 3.

Any lumination intensity value adjustments to the GUI 106A can be accomplished in various ways. For instance, adjustments can be made to individual windows (e.g., reflected in the respective CLT information 210 delivered to the compositor 206). Alternatively, unadjusted windows (e.g., CLT information) can be delivered to the compositor and the compositor can then make the adjustments as it generates the GUI 106A.

Figure 5:
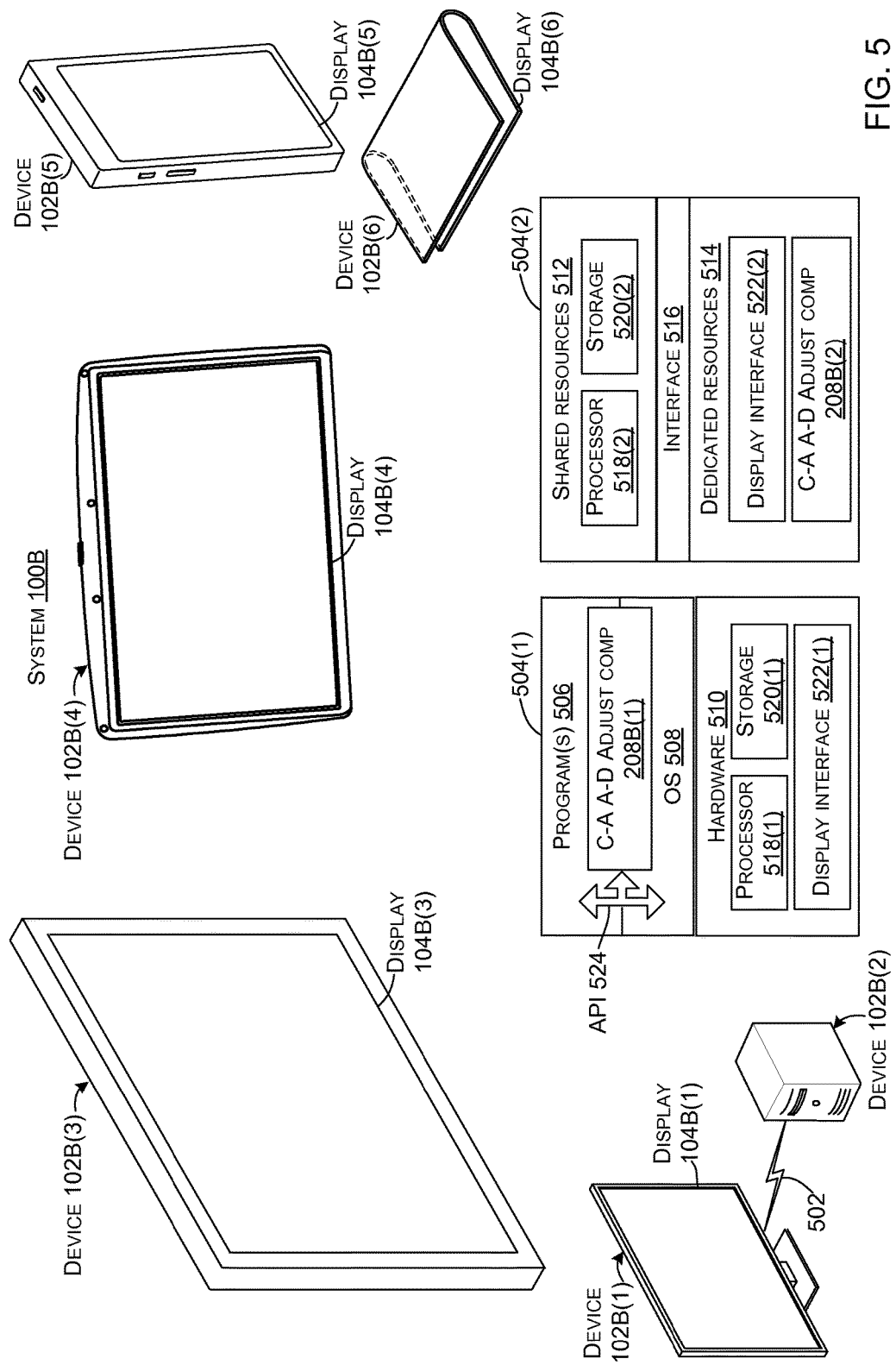

FIG. 5 illustrates an example system 100B that shows various device implementations. In this case, six device implementations are illustrated. Device 102B(1) can operate cooperatively with device 102B(2) that is manifest as a personal computer or entertainment console. Device 102B(3) is manifest as a television, device 102B(4) is manifest as a tablet, device 102B(5) is manifest as a smart phone, and device 102B(6) is manifest as a flexible or foldable device, such as an e-reader, tablet, or phone that can be flexed into different physical configurations, such as opened or closed.

Individual devices can include a display 104B. Devices 102B can communicate over one or more networks, such as network 502. While specific device examples are illustrated for purposes of explanation, devices can be manifest in any of a myriad of ever-evolving or yet to be developed types of devices.

Individual devices 102B can be manifest as one of two illustrated configurations 504(1) and 504(2), among others. Briefly, configuration 504(1) represents an operating system centric configuration and configuration 504(2) represents a system on a chip configuration. Configuration 504(1) is organized into one or more applications or programs 506, operating system 508, and hardware 510. Configuration 504(2) is organized into shared resources 512, dedicated resources 514, and an interface 516 there between.

In either configuration, the devices 102B can include a processor 518, storage/memory (e.g., computer-readable storage media) 520, a display interface 522, and/or a context-aware anti-degradation component 208B. The function of these elements is described in more detail above relative to FIGS. 1-4 and below relative to FIGS. 6-8. Individual devices can alternatively or additionally include other elements, such as input/output devices, buses, etc., which are not illustrated or discussed here.

Devices 102B(1) and 102B(2) can be thought of as operating cooperatively to perform the present concepts. For instance, device 102B(2) may include an instance of processor 518, storage 520, display interface 522, and/or context-aware anti-degradation component 208B. The device 102B(2) can receive content data and process the content data into frame renderings that adjust lumination intensities (e.g., dim pixels) on the display 104B(1) of device 102B(1). Device 102B(2) can send adjusted frame renderings to device 102B(1) for presentation on display 104B(1). In contrast, devices 102B(3)-102B(6) may be self-contained devices that include both an instance of the display 104B and an instance of processor 518, storage 520, display interface 522, and/or context-aware anti-degradation component 208B. Thus, in this implementation, device 102B(2) can implement the present concepts and send the adjusted frames to device 102B(1) for presentation. As such, device 102B(1) can be a legacy (e.g., pre-existing device) that when coupled to device 102B(2) can offer high visual performance for relatively longer periods due to decreased incidents of burn-in while making adjustments in a manner that maintain a pleasing user experience.

In an alternative implementation, a device such as device 102B(3) could include a SOC configuration, such as an application specific integrated circuit (ASIC) that includes context-aware anti-degradation component 208B. Such a device can maintain a high level of performance with reduced burn-in degradation. Other device implementations, such as tablet device 102B(4), can include a processor 518, such as a CPU and/or GPU, that renders frames and can also execute the context-aware anti-degradation component 208B on the same processor or on another processor.

From one perspective, any of devices 102B can be viewed as computers. The term "device," "computer," or "computing device" as used herein can mean any type of device that has some amount of processing capability and/or storage capability. Processing capability can be provided by one or more processors that can execute data in the form of computer-readable instructions (e.g., computer-executable instructions) to provide a functionality. Data, such as computer-readable instructions and/or user-related data, can be stored on storage, such as storage that can be internal or external to the computer. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and/or flash memory, among others.

In one operating system centric configuration 504(1), the context-aware anti-degradation component 208B(1) can be embedded in program 506 and/or operating system 508 to receive change information 214 (FIG. 2) from the operating system. Note that context-aware anti-degradation component 208B(1) doesn't need to make direct comparisons between frames with associated resource usage (e.g., memory and processing) and instead can leverage change information produced by the operating system. The context-aware anti-degradation component 208B(1) can obtain CLT information 210 (FIG. 2) via an application program interface (API) 524. The context-aware anti-degradation component 208B(1) can utilize the CLT information to adjust frame renderings for delivery to the display interface 522(1).

As mentioned above, configuration 504(2) can be viewed as a system on a chip (SOC) type design. In such a case, functionality provided by the device can be integrated on a single SOC or multiple coupled SOCs. One or more processors 518(2) can be configured to coordinate with shared resources 512, such as memory, storage 520(2), etc., and/or one or more dedicated resources 514, such as hardware blocks configured to perform certain specific functionality. Thus, the term "processor" as used herein can also refer to central processing units (CPUs), graphical processing units (CPUs), controllers, microcontrollers, processor cores, or other types of processing devices. The context-aware anti-degradation component 208B(2) can be manifest as dedicated resources 514 and/or as shared resources 512.

One example SOC implementation can be manifest as an application specific integrated circuit (ASIC), a field programmable gate array (FPGA), and/or other circuitry. The ASIC/FPGA/circuitry can include the context-aware anti-degradation component 208B(2). For example, the ASIC/FPGA/circuitry can include logic gates and memory or may be a microprocessor executing instructions to accomplish the functionality associated with the context-aware anti-degradation component 208B(2), such as the functionality described below relative to FIGS. 6-8. For instance, the ASIC/FPGA/circuitry can be configured to convert image data into frame renderings for multiple pixels. The ASIC/FPGA/circuitry can alternatively or additionally be configured to receive a frame rendering and to generate an adjusted frame rendering that dims individual pixels to reduce pixel degradation. In one implementation, the ASIC/FPGA/circuitry may be manifest in, on, or relative to, a monitor type device, such as device 102B(3) that does not include another processor. In another implementation, the ASIC/FPGA/circuitry may be associated with a display in a device that also includes a CPU and/or GPU. For instance, in a device such as tablet device 102B(4), the ASIC/FPGA/circuitry may be associated with display 104B(4) and may receive frame renderings from the device's CPU/GPU and then adjust the frame renderings to reduce burn-in. Thus, in some implementations, ASIC/FPGA/circuitry may be dedicated to implementing the context-aware anti-degradation adjustment component 208B(2). In other implementations, the ASIC/FPGA/circuitry may implement the anti-degradation adjustment component and/or other functionality.

Generally, any of the functions described herein can be implemented using software, firmware, hardware (e.g., fixed-logic circuitry), or a combination of these implementations. The term "component" as used herein generally represents software, firmware, hardware, circuitry, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Method Examples

Figure 6:
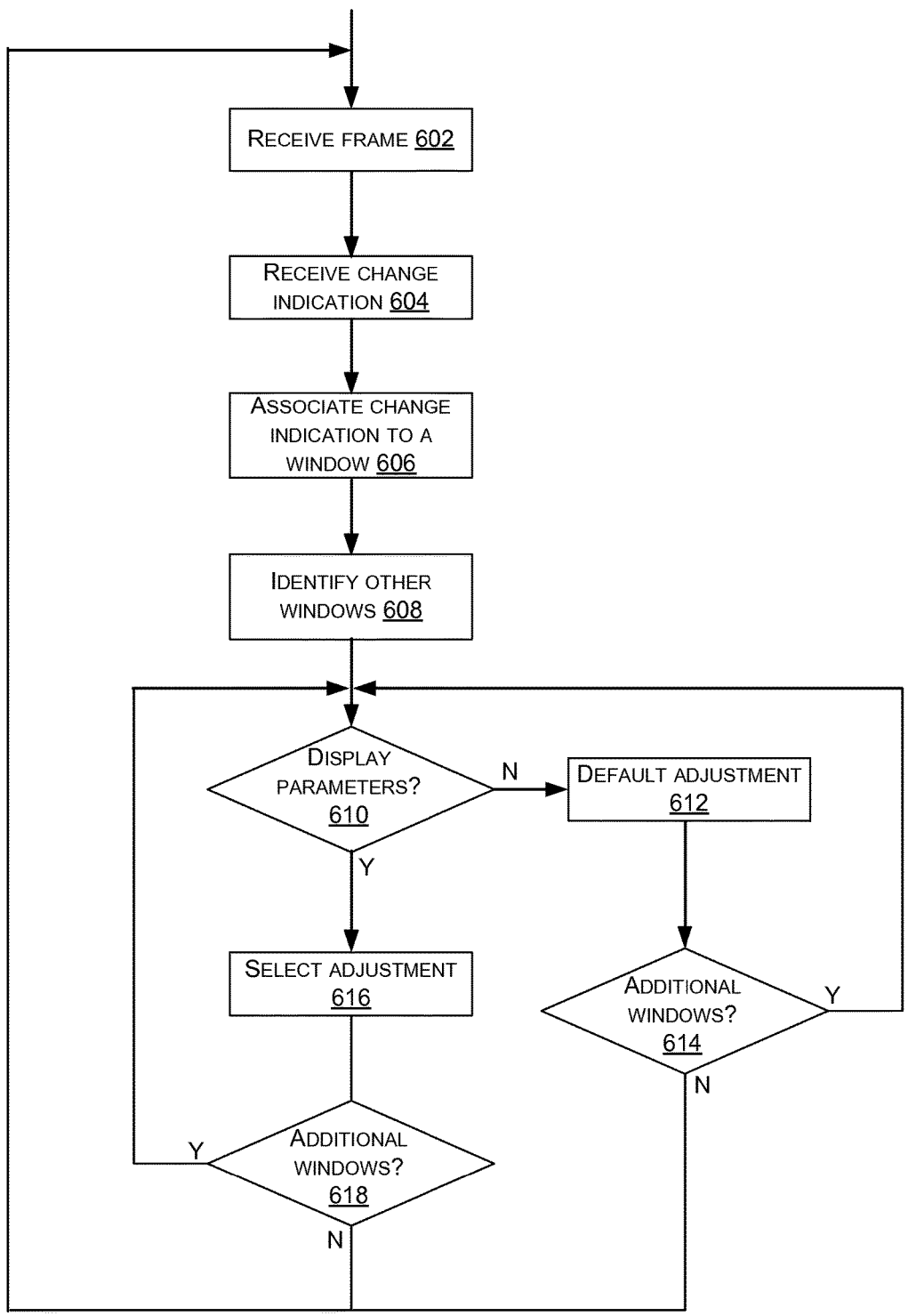
FIGS. 6-8 show example context-aware anti-degradation adjustment flowcharts in accordance with some implementations of the present concepts.

FIG. 6 shows an example computer implemented method or process 600. In this case, block 602 can receive a frame for rendering on a display.

Block 604 can receive a change indication relating to the frame. The change indication can relate to one or more pixels, groups of pixels, rows of pixels, and/or organization of pixels, such as a window. For instance, the change indication can be manifest as a changed pixel indication and/or a changed window indication. Note also that not receiving a change indication can be treated as indicating that the frame is static and thus is a candidate for context-aware anti-degradation adjustment. Stated another way, lack of a change indication can be treated as an indication of static pixels without actually comparing frames.

Block 606 can associate the change indication to a window of the frame.

Block 608 can identify other windows of the frame that are not associated with the change indication.

Block 610 can identify whether display parameters are available that relate to individual windows. Display parameters can be user defined, programmer defined (e.g., program specific display parameters), relate to ambient conditions (e.g., ambient condition display parameters), and/or relate to properties of a device upon which the frame is to be displayed (e.g., device specific display parameters), among others.

If no display parameters are available, (e.g., 'no' at 610) the method can proceed to block 612. This block can adjust lumination intensity values for one or more pixels of the display device based upon default values. The method can then determine whether the frame includes additional windows at 614. If additional windows are present, the method can return to block 610 until all windows are addressed. Once all windows are addressed (e.g., 'no' at 614) the method can return to block 602 to await another frame.

Returning to block 610, if display parameters are available, (e.g., 'yes' at 610) the method can proceed to block 616. This block can select a lumination intensity value adjustment that satisfies the display parameters. Some configurations can weight individual display parameters so that an adjustment can be selected despite conflicting display parameters. For instance, user defined parameters can be weighted higher than other display parameters. Similarly, display parameters that are defined for the specific type of display device that is being used can be weighted higher than display parameters that are generic to different types of display devices. Further, the duration that an individual pixel has been static can affect the relative weights of parameters relating to that pixel (and/or the window that the pixel resides). For example, if a pixel has been static for one minute, parameters that maintain color integrity of the window in which the pixel resides may be weighted relatively highly, whereas if the pixel is still static after an hour, the parameters relating to maintaining color integrity may be weighted relatively lower, for instance.

The method can address additional windows at block 618 by looping back to block 610 until all windows are addressed. Once all windows are addressed at block 618, the method can return to block 602 to await another frame.

Figure 7:
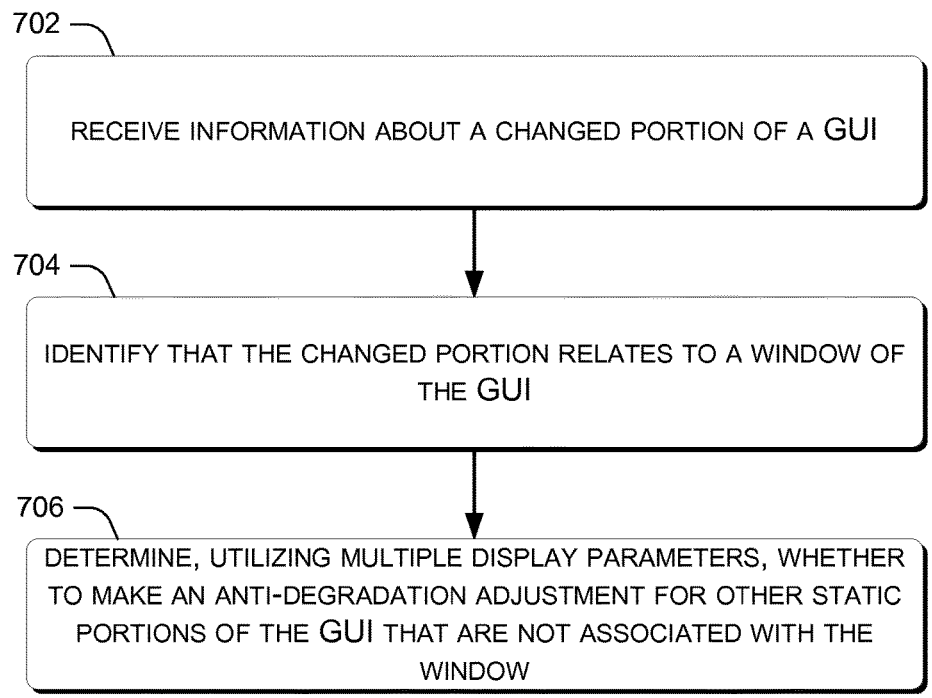

FIG. 7 shows an example computer implemented method or process 700. In this case, block 702 can receive information about a changed portion of a GUI.

Block 704 can identify that the changed portion relates to a window of the GUI.

Block 706 can determine, utilizing multiple display parameters, whether to make an anti-degradation adjustment for other static portions of the GUI that are not associated with the window.

Figure 8:
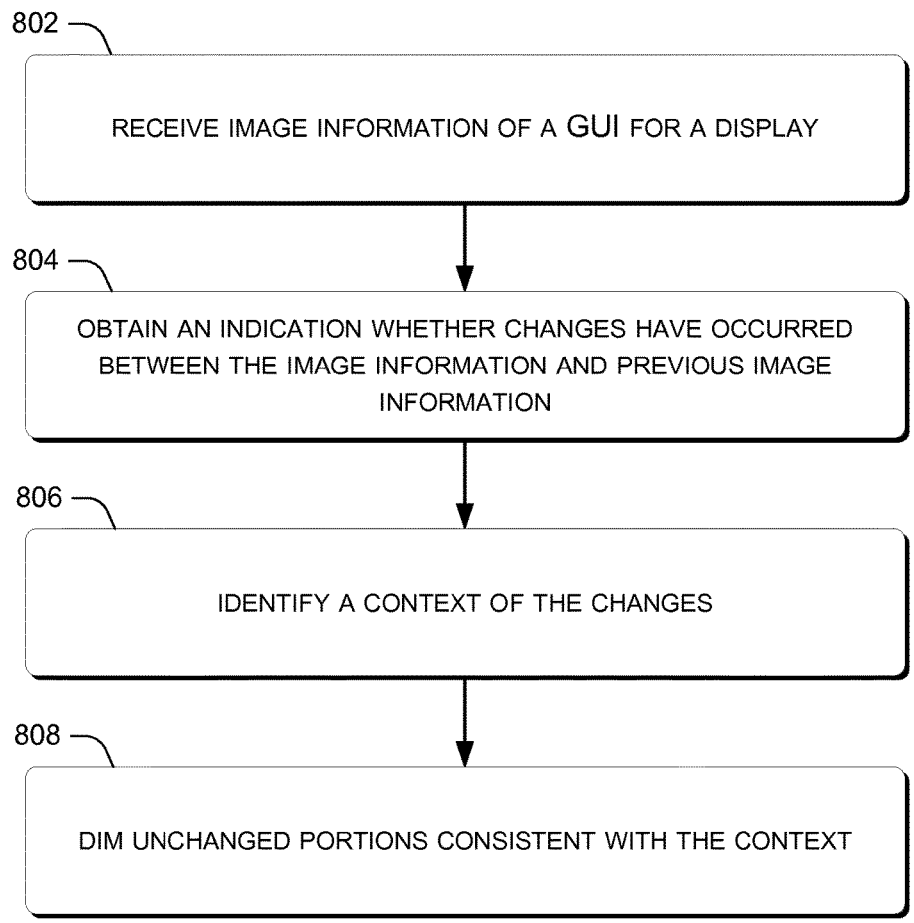

FIG. 8 shows an example computer implemented method or process 800. In this case, block 802 can receive image information of a GUI for a display.

Block 804 can obtain an indication whether changes have occurred between the image information and previous image information.

Block 806 can identify a context of the changes.

Block 808 can dim unchanged portions of the corresponding image consistent with the context.

The described methods can be performed by the systems and/or devices, such as the context-aware anti-degradation component, described above and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a computing device causes the computing device to perform the method (e.g., computer or device implemented method).

Additional Examples

Various device examples are described above. Additional examples are described below. One example is manifest as a display that includes a set of multiple pixels. Individual pixels comprise multiple color light emitting diodes (LEDs). The example also includes a processor configured to convert image related data into frame renderings for driving the multiple pixels of the display at lumination intensity values to generate a corresponding image. The example also includes a context-aware anti-degradation component configured to receive change information from the processor of a change to an individual frame rendering and to adjust individual lumination intensity values of unchanged portions of the individual frame rendering without comparing the individual frame rendering to a previous individual frame rendering.

Another example can include any combination of the above and/or below examples where the context-aware anti-degradation component comprises an operating system executed by the processor, the operating system configured to generate the individual frame rendering or wherein the context-aware anti-degradation component comprises a compositor configured to organize windows of the individual frame rendering into a graphical user interface (GUI) represented in the individual frame rendering.

Another example can include any combination of the above and/or below examples where the change information relates to an individual pixel or multiple pixels.

Another example can include any combination of the above and/or below examples where the context-aware anti-degradation component is configured to identify a context of the individual pixel via multiple display parameters.

Another example can include any combination of the above and/or below examples where the context relates to identifying an individual window affected by the individual pixel or identifying other windows in the unchanged portions that are not affected by the individual pixel.

Another example can include any combination of the above and/or below examples where individual display parameters are user defined, program specific, device specific, or relate to ambient operating conditions.

Another example includes receiving information about a changed portion of a GUI and identifying that the changed portion relates to a window of the GUI. This example also includes determining, utilizing multiple display parameters, whether to make an anti-degradation lumination intensity adjustment for other static portions of the GUI that are not associated with the window.

Another example can include any combination of the above and/or below examples where the changed portions comprise the window or an individual pixel of the window.

Another example can include any combination of the above and/or below examples where the information comprises a changed pixel indication relating to the individual pixel or a changed window indication relating to the window.

Another example can include any combination of the above and/or below examples where the adjustment comprises decreasing a lumination intensity of some or all of the other static portions.

Another example can include any combination of the above and/or below examples where the other static portions comprise another window that is associated with a program and wherein the decreasing comprises decreasing the lumination in a manner defined by the program or by a user of the program.

Another example can include any combination of the above and/or below examples where the window is also associated with the program, or wherein the window is associated with a different program.

Another example can include any combination of the above and/or below examples where associated with the window comprises in the window or on a border of the window.

Another example can include any combination of the above and/or below examples where the multiple display parameters comprise program specific display parameters, user defined display parameters, and ambient condition display parameters.

Another example can include any combination of the above and/or below examples where the determining further comprises determining whether to make the anti-degradation adjustment to the window.

Another example can include any combination of the above and/or below examples where the anti-degradation adjustment is employed to both the other static portions and the window.

Another example includes receiving image information of a GUI for a display and obtaining an indication whether changes have occurred between the image information and previous image information identifying a context of the changes. This example also includes dimming unchanged portions of the GUI consistent with the context.

Another example can include any combination of the above and/or below examples where the image information relates to color, location, and/or transparency.

Another example can include any combination of the above and/or below examples where the image information relates to a first frame and the previous image information relates to a second directly preceding frame or wherein the previous image information relates to a second frame where intervening frames occur between the first frame and the second frame.

Another example can include any combination of the above and/or below examples where the context identifies a window in which the changes occurred and wherein the unchanged portions comprise other windows.

Another example includes a display that includes a set of multiple pixels. Individual pixels comprise multiple color light emitting diodes (LEDs). The example also includes a context-aware anti-degradation circuit that receives frame renderings for driving the multiple pixels of the display at lumination intensity values to generate a corresponding image and change information that indicates a change to an individual frame rendering compared to a previous individual frame rendering. The context-aware anti-degradation circuit adjusts individual lumination intensity values of unchanged portions of the individual frame rendering without comparing the individual frame rendering to the previous individual frame rendering.

Another example can include any combination of the above and/or below examples where the context-aware anti-degradation circuit comprises an application specific integrated circuit (ASIC) or a field programmable gate array (FPGA).

Another example can include any combination of the above and/or below examples where the ASIC or the FPGA further converts image related data into the frame renderings.

Another example can include any combination of the above and/or below examples where the ASIC or the FPGA receives the frame renderings from a processor.

Another example can include any combination of the above and/or below examples where the system includes the processor or wherein the system does not include the processor.

CONCLUSION

Although techniques, methods, devices, systems, etc., pertaining to reducing display degradation are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
 a display comprising a set of multiple pixels, and wherein individual pixels comprise multiple color light emitting diodes (LEDs);
 a processor configured to convert image related data into frame renderings for driving the multiple pixels of the display at lumination intensity values to generate a corresponding image; and,
 a context-aware anti-degradation component configured to:
  receive change information from the processor of a change to an individual frame rendering,
  receive user defined display parameters, and
  adjust individual lumination intensity values of unchanged portions of the individual frame rendering in accordance with the user defined display parameters without comparing the individual frame rendering to a previous individual frame rendering.

2. The system of claim 1, wherein the context-aware anti-degradation component comprises an operating system executed by the processor, the operating system configured to generate the individual frame rendering or wherein the context-aware anti-degradation component comprises a compositor configured to organize windows of the individual frame rendering into a graphical user interface (GUI) represented in the individual frame rendering.

3. The system of claim 1, wherein the change information relates to an individual pixel or multiple pixels.

4. The system of claim 3, wherein the context-aware anti-degradation component is configured to identify a context of the individual pixel via multiple display parameters, including the user defined display parameters.

5. The system of claim 4, wherein the context relates to identifying an individual window affected by the individual pixel or identifying other windows in the unchanged portions that are not affected by the individual pixel.

6. The system of claim 4, wherein the multiple display parameters further comprise program specific display parameters, device specific display parameters, and/or other display parameters that relate to ambient operating conditions.

7. A system, comprising:
 a display comprising a set of multiple pixels, and wherein individual pixels comprise multiple color light emitting diodes (LEDs); and,
 a context-aware anti-degradation circuit that receives frame renderings for driving the multiple pixels of the display at lumination intensity values to generate a corresponding image and change information that indicates a change to an individual frame rendering compared to a previous individual frame rendering and adjusts individual lumination intensity values of unchanged portions of the individual frame rendering without comparing the individual frame rendering to the previous individual frame rendering, an amount of the adjustment of the individual lumination intensity values based at least in part on previously user defined display parameters.

8. The system of claim 7, wherein the context-aware anti-degradation circuit comprises an application specific integrated circuit (ASIC) or a field programmable gate array (FPGA).

9. The system of claim 8, wherein the ASIC or the FPGA further converts image related data into the frame renderings.

10. The system of claim 8, wherein the ASIC or the FPGA receives the frame renderings from a processor.

11. The system of claim 10, wherein the system includes the processor or wherein the system does not include the processor.

12. The system of claim 7, wherein the amount of the adjustment comprises no adjustment in accordance with the previously user defined display parameters.

13. A system, comprising:
 a display comprising a set of multiple pixels, individual pixels comprising multiple color light emitting diodes (LEDs), the display having a degradation risk associated with a type of the display;
 a processor; and,
 storage storing computer executable instructions which, when executed by the processor, cause the processor to:
  convert image related data into frame renderings for driving the multiple pixels of the display at lumination intensity values to generate a corresponding image,
  receive change information from the processor of a change to an individual frame rendering, and
  based at least in part on the degradation risk associated with the type of the display, adjust individual lumination intensity values of unchanged portions of the individual frame rendering without comparing the individual frame rendering to a previous individual frame rendering.

14. The system of claim 13, wherein the changed individual frame rendering comprises a changed window or a changed individual pixel of the window.

15. The system of claim 14, wherein the change information comprises a changed pixel indication relating to the changed individual pixel or a changed window indication relating to the changed window.

16. The system of claim 13, wherein the adjustment to the individual lumination intensity values comprises decreasing a lumination intensity of some or all of the unchanged portions.

17. The system of claim 16, wherein the changed individual frame rendering comprises a changed window and wherein the unchanged portions comprise another window that is associated with a program and wherein the decreasing comprises decreasing the lumination in a manner defined by the program or by a user of the program.

18. The system of claim 17, wherein the changed window is also associated with the program, or wherein the changed window is associated with a different program.

19. The system of claim 18, wherein associated with the changed window comprises in the changed window or on a border of the changed window.

20. The system of claim 13, wherein the adjustment to the individual lumination intensity values is based at least in part on program specific display parameters, user defined display parameters, and ambient condition display parameters.

21. The system of claim 13, wherein the adjustment to the individual lumination intensity values is employed to both the unchanged portions and the changed individual frame rendering.

22. A computer implemented method, comprising:
 converting image related data into frame renderings for driving multiple pixels of a display at lumination intensity values to generate a corresponding image, individual pixels of the display comprising multiple color light emitting diodes (LEDs);

receiving change information of a change to an individual frame rendering;

obtaining ambient operating conditions of the display; and, based at least in part on the ambient operating conditions, adjusting individual lumination intensity values of unchanged portions of the individual frame rendering without comparing the individual frame rendering to a previous individual frame rendering.

23. The computer implemented method of claim 22, wherein the ambient operating conditions comprise ambient lighting at a location of the display.

24. The computer implemented method of claim 22, wherein the image related data relates to color, location, and/or transparency.

25. The computer implemented method of claim 22, wherein the change information relates to a first frame and the image related data relates to a second directly preceding frame or wherein the image related data relates to a second frame where intervening frames occur between the first frame and the second frame.

* * * * *